United States Patent
Lambert (10) Patent No.: US 12,341,595 B2
(45) Date of Patent: Jun. 24, 2025

(54) COMMUNICATION STRUCTURES

(71) Applicant: BAE SYSTEMS PLC, London (GB)

(72) Inventor: Clare Jennifer Tanner Lambert, Warton (GB)

(73) Assignee: BAE SYSTEMS PLC, London (GB)

( * ) Notice: Subject to any disclaimer, the term of this patent is extended or adjusted under 35 U.S.C. 154(b) by 76 days.

(21) Appl. No.: 18/031,922

(22) PCT Filed: Oct. 5, 2021

(86) PCT No.: PCT/GB2021/052564
§ 371 (c)(1),
(2) Date: Apr. 14, 2023

(87) PCT Pub. No.: WO2022/079412
PCT Pub. Date: Apr. 21, 2022

(65) Prior Publication Data
US 2023/0396319 A1    Dec. 7, 2023

(30) Foreign Application Priority Data
Oct. 14, 2020  (GB) .................................... 2016301

(51) Int. Cl.
*H04B 3/36* (2006.01)
*H04B 7/17* (2006.01)
(Continued)

(52) U.S. Cl.
CPC ..... *H04B 7/18504* (2013.01); *H04B 7/18506* (2013.01); *H04W 16/18* (2013.01)

(58) Field of Classification Search
CPC ........... H04B 7/18504; H04B 7/18506; H04W 16/18; G08C 17/02
(Continued)

(56) References Cited

U.S. PATENT DOCUMENTS

2017/0242431 A1* 8/2017 Dowlatkhah .......... G08C 17/02
2018/0317267 A1   11/2018 Chong et al.
(Continued)

FOREIGN PATENT DOCUMENTS

KR    20190063815 A    6/2019
WO    2016161637 A1   10/2016

OTHER PUBLICATIONS

International Search Report dated Jan. 31, 2022 issued in PCT/GB2021/052564.
(Continued)

*Primary Examiner* — Phuong Phu
(74) *Attorney, Agent, or Firm* — Scully, Scott, Murphy & Presser, P.C.

(57) ABSTRACT

In some examples, a method for determining a communication structure to communicatively link a set of delivery unmanned aerial vehicles, UAVs, with a base unit, the communication structure defined by a minimum number of communication UAVs positioned relative to a set of delivery routes of the delivery UAVs at multiple transitory static positions, wherein a communication UAV at a transitory static position supports a communication region, comprises determining a subset of delivery UAVs outside of a communication region of a first communication UAV at a first transitory static position, the subset of delivery UAVs representing a number of unsupported delivery UAVs that are not communicatively linked, via the first communication UAV, to the base unit supplementing the number of communication UAVs with a second communication UAV, and selecting a second transitory static position for the second communication UAV, the second transitory static position minimising a metric representing a number of unsupported delivery UAVs.

19 Claims, 5 Drawing Sheets

(51) Int. Cl.
    *H04B 7/185*     (2006.01)
    *H04L 25/20*     (2006.01)
    *H04L 25/52*     (2006.01)
    *H04W 16/18*     (2009.01)

(58) Field of Classification Search
    USPC .......................................... 375/211, 219, 220
    See application file for complete search history.

(56) References Cited

U.S. PATENT DOCUMENTS

2018/0319495 A1   11/2018   Tu
2018/0323862 A1   11/2018   Gong et al.
2019/0045580 A1    2/2019   Chai et al.

OTHER PUBLICATIONS

GB Search Report dated Mar. 16, 2021 issued in GB 2016301.0.
Chunbo Luo et al: "Communication provision for a team of remotely searching OAVs: A mobile relay approach", 2012 IEEE Globecom Workshops (GC WKSBPS 2012) : Anaheim, California, USA, Dec. 3-7, 2012, IEEE, Piscataway, NJ, Dec. 3, 2012 (Dec. 30, 2012), pp. 1544-1549, XP032341615.

* cited by examiner

COMMUNICATION STRUCTURES

TECHNICAL FIELD

Aspects relate, in general, to a method for providing a communication structure and more specifically, although not exclusively, to a method for determining a communication structure to communicatively link a set of delivery-centric unmanned aerial vehicles.

BACKGROUND

The use of unmanned aerial vehicles (UAVs) for payload delivery is an emerging area that is undergoing a large amount of activity as the range and capacity of UAVs increases. Aside from payload delivery in a commercial context, UAVs may also be used in situations in which more conventional methods of delivery are impractical. For example, in the immediate aftermath of a disaster in which there is a requirement to deliver relief goods. In such situations, physically delivering aid to cut-off locations can be challenging. For example, ground vehicles may be able to reach the vicinity of such locations, but factors such as flooding, warzones, or earthquake damage to roads may prevent direct travel to areas where the aid is required most. Dropping aid from small aircraft or helicopters may be impractical due to lack of equipment and qualified pilots. UAVs however, being less impeded by such factors, are a good candidate vehicle for last-mile aid delivery.

However, the use of UAVs in this context poses communication challenges not encountered with traditional delivery methods. For example, although UAVs can fly and deliver goods autonomously over reasonable distances, use over larger distances which require, e.g., live video streams, manual operator control (e.g., to find a suitable delivery drop-off location), or dynamic rerouting, may require UAVs to be in low-latency communication range of a base station. That is, in a situation in which conditions can rapidly change, it may be necessary to be able to monitor and/or control a delivery UAV.

SUMMARY

According to an example, there is provided a method for determining a communication structure to communicatively link a set of delivery unmanned aerial vehicles, UAVs, with a base unit, the communication structure defined by a minimum number of communication UAVs positioned relative to a set of delivery routes of the delivery UAVs at multiple transitory static positions, wherein a communication UAV at a transitory static position supports a communication region, the method comprising determining a subset of delivery UAVs outside of a communication region of a first communication UAV at a first transitory static position, the subset of delivery UAVs representing a number of unsupported delivery UAVs that are not communicatively linked, via the first communication UAV, to the base unit, supplementing the number of communication UAVs with a second communication UAV, and selecting a second transitory static position for the second communication UAV, the second transitory static position minimising a metric representing a number of unsupported delivery UAVs. The subset of delivery UAVs can be determined at each point in time corresponding to presence of a delivery UAV at a target location disposed along the delivery route. The method can further comprise regulating the minimum number of communication UAVs on the basis of a maximum number of communication hops from a delivery UAV to the base unit.

In an example, the set of delivery routes of the delivery UAVs can be generated on the basis of a number of delivery UAVs, a location of a base unit, and a number and location of target location. A set of static positions for communication UAVs can be generated on the basis of the set of delivery routes. A route for a communication UAV can be generated using the set of static positions as waypoints. Unsupported delivery UAVs can be grouped into one or more clusters defined by a maximum intra-cluster distance related to the communication region. The result of grouping into clusters can be used by a heuristic, e.g., in one of the processes described in more detail below.

The intra-cluster distance can be twice the communication range of a communication UAV. Unsupported delivery UAVs can be grouped using agglomerative hierarchical clustering to form a single-point cluster or augment an existing cluster. The method can further comprise determining a cluster furthest from a supported communication region, and determining a number of additional communication UAVs to support the cluster furthest from a supported communication region.

According to an example, there is provided a system, comprising a set of communication UAVs forming a communication structure to communicatively link a set of delivery UAVs with a base unit, wherein the communication UAVs are positioned relative to a set of delivery routes of the delivery UAVs at multiple transitory static positions whereby to provide a communication link between an airborne delivery UAV and the base unit. A communication UAV at a transitory static position can support a communication region. A communication UAV can support multiple communication protocols, e.g., Wi-Fi and a telecommunication network protocol. A first communication protocol can be used to provide intra-communication-region communication, and a second communication protocol can be used to provide inter-communication-region communication. In an implementation, the communication UAVs form a communication relay structure between a delivery UAV and the base unit.

According to an example, there is provided a non-transitory machine-readable storage medium comprising instructions executable by a processor, the machine-readable storage medium comprising instructions to generate a set of static relay positions defining a communication link for a set of delivery UAVs, the static relay positions so positioned relative to a delivery route of a delivery UAV as to enable communication between an airborne delivery UAV and a base unit. The non-transitory machine-readable storage medium can further comprise instructions to group a set of unsupported delivery UAVs into one or more clusters defined by a maximum intra-cluster distance related to a communication region; generate a single-point cluster or augment an existing cluster using an agglomerative hierarchical clustering process; determine a cluster furthest from a supported communication region, and determine a number of additional communication UAVs to support the cluster furthest from a supported communication region.

BRIEF DESCRIPTION OF THE DRAWINGS

For a more complete understanding of the present disclosure, reference is now made, by way of example only, to the following descriptions taken in conjunction with the accompanying drawings, in which.

DESCRIPTION

Example embodiments are described below in sufficient detail to enable those of ordinary skill in the art to embody and implement the systems and processes herein described. It is important to understand that embodiments can be provided in many alternate forms and should not be construed as limited to the examples set forth herein. Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

A mobile ad-hoc network (MANET) comprises a set of mobile nodes connected together wirelessly to form a self-configured network with no fixed infrastructure. Broadly speaking, each node in the network operates as a router to forward traffic to other specified node(s) in the network.

Flying ad hoc networks (FANETs) are a type of MANET configuration in which some of the nodes comprise unmanned aerial vehicles (UAVs) used to communicatively couple ground-based end points. A FANET therefore differs from a MANET, for example, as a result of the use of high mobility of UAVs. The use of UAVs enables connectivity to be provided to hard-to-reach places, such as regions where there have been natural disasters or even for military applications. For example, following a catastrophic event, traditional network infrastructures can suffer damage and may be subject to automatic shutdowns. However, a FANET can be used to restore communication and operating ranges may be extended by using multi-hop communication enabled by a chain of UAVs connected at one end to a base station.

Many commercial off-the-shelf (COTS) UAVs, commonly referred to as 'drones', can implement communications based on the IEEE 802.11 family of standards, such as Wi-Fi for example. The range of such communications are around 100 m and therefore unsuitable for UAVs operating at long distance. In alternative implementations, mesh-networking (as per the IEEE 802.11s standard) allows data to be dynamically routed to a control or base unit through multiple hops to other UAVs, thus extending the range to kilometres with the use of intermediary UAVs acting as communication relays. That is, mesh-networking enables UAVs to interconnect with one another in order to create a wireless local area network (WLAN). Such networks are suitable for relatively fixed topologies and wireless ad hoc networks. However, in situations such as that described above in the context of disaster relief for example, in which high transmission rates would be beneficial (e.g., in case operator-in-the loop control is needed), the 802.11s protocol is generally not suitable as it does not always choose the highest throughput route for communications. Rather, it will, for example, choose an intermittent single-hop over a more stable two-hop route. This may be problematic for streaming optical sensor data, which may be required to confirm delivery drop viability and subsequent success for example.

In other examples implementing longer distance communications, UAVs may be provided with cellular communication equipment enabling them to operate using 5G, beyond 5G (B5G), or 6G and so on telecommunication networks. These offer stable, high capacity communication links over long distances. However, in situations where there is a non-static network of UAVs, Doppler effects stemming from the high relative velocity between UAVs may hamper the effectiveness of such communication protocols. This is especially problematic in the situations mentioned above in which stable low-latency links are used to maintain contact with UAVs that may require user monitoring and intervention due to unknown environmental conditions and other uncontrollable events.

In the context of delivery or reconnaissance using UAVs for the purposes of, e.g., relief distribution, a delivery UAV may follow one or more routes defined by a number of waypoints, which may be points at which the delivery UAV either deposits some or all of a payload, performs reconnaissance, or both. In order to enable a communication link between a set of delivery UAVs and a base unit from which the delivery UAVs are monitored or controlled for example, a communication link may be provided. According to an example, such a communication link is provided by a communication structure. The communication structure is so configured as to communicatively link the set of delivery UAVs with the base unit and is defined by a set of communication UAVs. A communication UAV can be routed, taking into account a route of a delivery UAV, in order to preserve the communication link between the delivery UAV and the base unit. In an example, the base unit can be a base station of a communication network, or part of a system configured for control and monitoring of UAV.

In an implementation, a set of communication UAVs are provided at multiple positions relative to a set of delivery routes of delivery UAVs. At the positions, a communication UAV will be static and airborne for a predetermined period of time that is dictated by the planned delivery routes of a set of delivery UAVs. A communication UAV at such a temporary or transitory static position supports a communication region. A delivery UAV passing through the communication region of a communication UAV can use the communication UAV as a relay for communications ultimately destined for and/or to be received from the base unit.

That is, at a given position, a communication UAV can be configured to act as a relay to communicatively link any delivery UAVs within its communication region with, for example, another communication UAV or the base unit.

Accordingly, a network of communication UAVs can be routed and positioned with respect to planned delivery routes of a set of delivery UAVs in order to preserve the ability of the delivery UAVs to be in communication with a base unit. In an example, the structure of the communication UAVs (i.e., the communication structure) can change over time in order to accommodate changes in delivery UAV routes and/or numbers.

According to an example, a communication UAV does not comprise any payload (or associated hardware or software used to enable a payload to be installed, carried or delivered etc.). Thus, compared to a delivery UAV (which does comprise payload hardware and software to enable a payload to be installed, carried and delivered etc.), a communication UAV will be lighter and may be smaller. As such, communication UAVs may be more agile and/or faster than delivery UAVs and therefore able to quickly be deployed to regions in order to complete, augment or provide a communication structure as a result of, for example, changing conditions resulting in changes to delivery UAV routes and/or numbers.

According to an example, a system comprising heterogenous UAVs is provided, which is suitable for use in, e.g., disaster relief scenarios with unknown topography and/or changeable conditions. A set of delivery UAVs equipped with a delivery payload system and Wi-Fi are provided, and a set of communication UAVs are provided. The communication UAVs, forming a set of relay drones, comprise Wi-Fi and/or telecommunication network communication modules. In an example, the communication modules of the communication UAVs are used to connect a base unit (e.g., a base station or control apparatus) to the communication UAVs. In an implementation, communication UAVs can be connected to the base unit using telecommunication network communication modules. Delivery UAVs can be connected to the communication UAVs by way of single- or multi-hop Wi-Fi connections.

Figure 1:
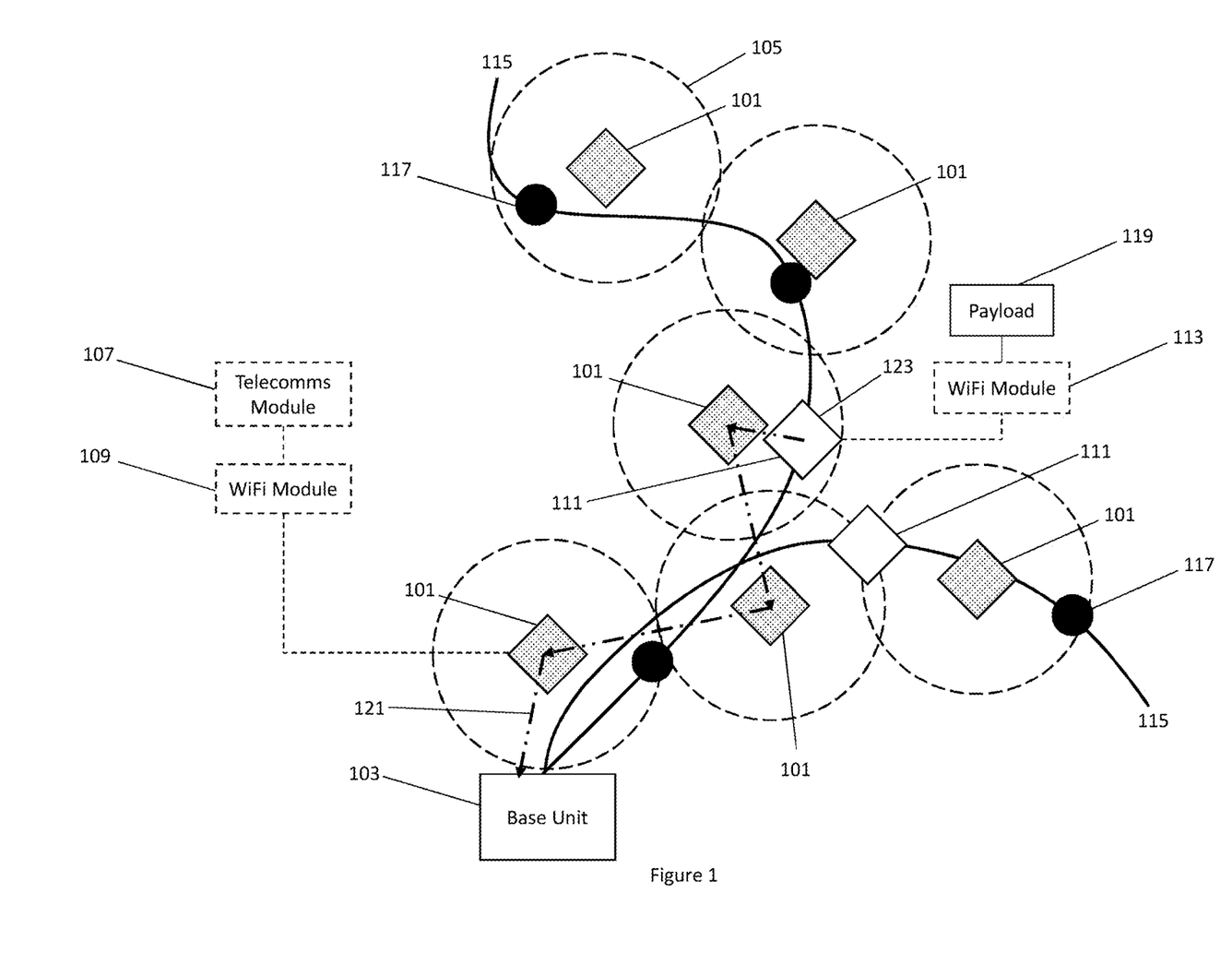
FIG. 1 is a schematic representation of a communication structure according to an example.

FIG. 1 is a schematic representation of a communication structure according to an example. A set of communication UAVs 101 are provided at multiple static positions relative to a base unit 103. Each communication UAV 101 supports a communication region 105. In the example of FIG. 1, each communication UAV comprises a telecommunication network communication module 107 and a Wi-Fi module 109. A set of delivery UAVs 111, each comprising a Wi-Fi module 113 are provided. Each delivery UAV 111 has an associated delivery route 115 in the example of FIG. 1, with two such routes being depicted. Along each delivery route 115 are one or more waypoints 117, which define points at which a delivery UAV 111 makes a delivery of some or all of a payload 119 and/or performs reconnaissance for example. That is, at each waypoint a delivery UAV 111 can make a stop, which may result in payload delivery and/or some other activity. At each position of a delivery UAV 111 along a route 115, the delivery UAV is communicatively coupled to the base unit 103. This enables control over delivery UAVs to be maintained and for information to be relayed to the base unit 103 as and when needed. For example, in the event that a delivery UAV experiences or undergoes an unexpected route deviation or change in environment that may lead to a requirement for user intervention, the delivery UAV can be monitored and/or controlled from the base unit 103.

In the example of FIG. 1, the communicative coupling is enabled by the communication structure, which is defined by the communication UAVs 101 and their positions relative to the base unit 103 and delivery UAVs 111 as they traverse their routes 115. The set of communication UAVs 101 form a relay structure for the delivery UAVs 111 that enables a stable communication link 121 to be maintained between a delivery UAV 111 and the base unit 103. The relative position of the communication UAVs 101 is dictated by the delivery routes 115 of the delivery UAVs. That is, over the course of its delivery route 115, the communication structure is so configured as to provide a stable and persistent communication link between a delivery UAV 111 and the base unit 103. In the example of FIG. 1, a first delivery UAV 123 is connected to a communication UAV 101 by way of its Wi-Fi module 113. The connection to the communication UAV 101 enables the communication link 121 to be established from the delivery UAV 123 to the base unit 103. This enables the UAV 123 to be situated at a relatively large distance from the base unit 103 whilst still being in stable communication therewith.

In an example, communication UAVs 101 are communicatively linked to one another using their telecommunication network communication modules 107, thereby enabling a maximum range between to be provided between them, which ultimately reduces the number of communication UAVs needed to form an effective communication structure that is able to robustly support a set of delivery UAVs.

Communication between a communication UAV 101 and a delivery UAV 123 that is within a communication region 105 can be provided by Wi-Fi so that it is not susceptible to the effects mentioned above that stem from the movement of the delivery UAVs 123 along their respective delivery routes. That is, according to an example, for a given set of delivery routes that are to be followed by a set of delivery UAVs 123, a set of communication UAVs 101 can be deployed to define a communication structure to support communication between a base unit 103 and the delivery UAVs 123. The communication structure, which can vary over time as a result of changes in the relative position of the communication UAVs 101, can be implemented between communication UAVs 101 using a relatively longer range communication protocol provided by, e.g., the telecommunication network communication modules 107, whilst communication between delivery UAVs 123 and the communication UAVs 101 can be implemented using Wi-Fi. Accordingly, intra communication structure links (i.e. between communication UAVs 101) can be provided by way of telecommunication network communication modules 107, whilst delivery UAVs 123 can communicate with the base unit 103 via communication UAVs (acting as relays) using Wi-Fi.

As can be seen from FIG. 1, at any point along one of the delivery routes 115, a delivery UAV is within the communication region (i.e. range) 105 of a communication UAV 101. Accordingly, a stable communication link to a delivery UAV 123 can be maintained at all points along delivery route, thereby enabling monitoring and, if necessary, control, of a delivery UAV 123.

As noted above, the communication structure may vary over time as the relative position of the communication UAVs 101 changes. Such changes can be implemented in order to re-task one or more communication UAVs 101 to alternate locations in order to maintain a communication structure that reliably enables a delivery UAV 123 to communicate with the base unit 103. For example, at a time t1, a set of communication UAVs may be configured in a first structure (such as shown in FIG. 1 for example). As the position of delivery UAVs 123 evolves from time t1 to a time t2 as they follow their delivery routes or because of unexpected deviations for example, the communication structure at time t1 may no longer be sufficient to enable a robust link between all delivery UAVs 123 and the base unit 103 (for example, due to a change in environmental conditions and/or failure of a communication UAV etc.). As such, the communication structure may be reconfigured (such as due to unforeseen circumstances) as the position of the delivery UAVs 123 changes over time in order to maintain communication links between the base unit 103 and the delivery UAVs 123.

Figure 2:
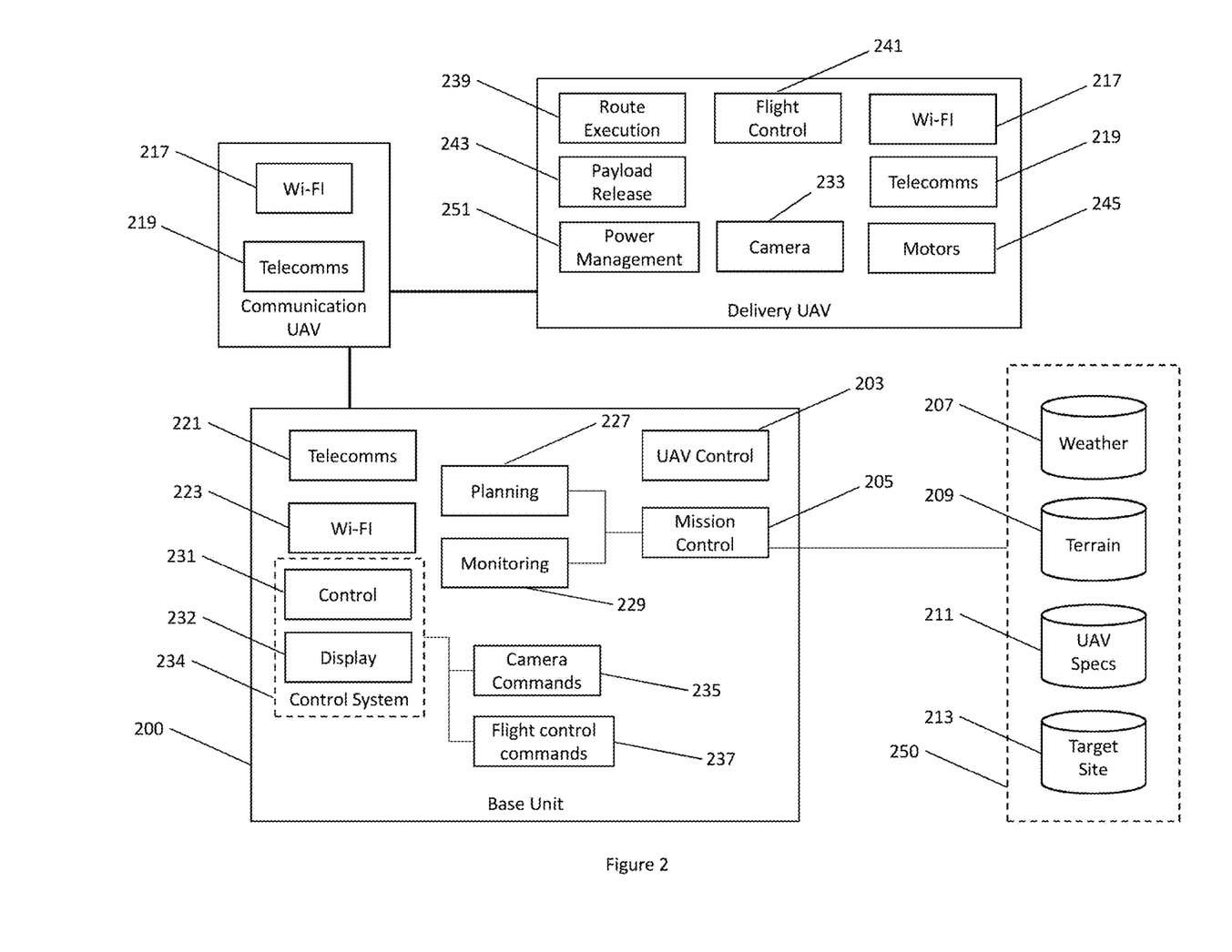
FIG. 2 is a schematic representation of a portion of a system according to an example.

FIG. 2 is a schematic representation of a portion of a system according to an example. A base unit 201 comprises a UAV control unit 203 and a mission control unit 205 that is configured, in the example of FIG. 2, to receive data from multiple sources in order to enable it to determine delivery routes for delivery UAVs and communication structures for communications UAVs. The multiple sources can include, e.g., a source 207 of weather data, a source 209 of terrain data, a source 211 of UAV specifications, a source 213 of target site data. The nature of these data sources will be explained in more detail below.

A communication UAV 215 comprises a Wi-Fi module 217 and a telecommunication network communication module 219 configured to receive data from (and transmit data to) a telecommunication network communication module 221 of the base unit 201. In the case that the communication UAV 215 is positioned within a predetermined range of the base unit enabling use of Wi-Fi, it may receive data from (and transmit data to) a Wi-Fi module 223 of the base unit 201. Multiple communication UAVs 215 can be arranged to form the communication structure, thereby implementing a multi-hop communication system enabling a delivery UAV to communicate with the base unit 201 over the course of its mission.

A delivery UAV 225 comprises a Wi-Fi module 217 configured to receive data from (and transmit data to) a Wi-Fi module 217 of a communication UAV 215. Accordingly, data to be sent to (or received from) the base unit 201 can be transmitted from (or to) the delivery UAV 225 via the communication structure defined by a set of the communication UAVs 215.

According to an example, route planning can be performed in a Planning Module 227 of the base unit 201. Other secondary base units, forming additional ground stations for example, can be incorporated to reload and recharge delivery UAVs 225 as required. Route planning using planning module 227 uses: target site data from the source 213, which can comprise e.g., locations, aid demand including weights; UAV specifications from the source 211 of UAV specifications, which can comprise e.g., maximum flight-times, payload capacity per drop mechanisms, communication ranges); terrain data from source 209, which can comprise e.g., elevation maps); and weather data from source 207, which can comprises e.g., wind speeds. In an example, a Monitoring Module 229 can monitor delivery UAV progress and receive status updates from each delivery UAV 225. If module 229 detects that a delivery UAV 225 is deviating from its predetermined route plan, it can alert an operator who may then decide to abort a route and have the delivery UAV 225 in question return to the base unit 201 autonomously, or be manually flown if a communication link is sufficient to enable satisfactory control. The UAV Control Unit 231 can be used to transmit manual flight and camera commands to a single UAV 225 and receive video and sensor data in return. In an example, the control unit 231 can form part of a control system 234 for a UAV incorporating, for example, a display 232 to receive a video feed from a camera 233 of a delivery UAV 225 and enable camera commands 235 and flight control commands 237 to be transmitted to a delivery UAV 225.

In an example, delivery UAV 225 comprises a route execution module 239 configured to monitor execution of a planned delivery route of a delivery UAV 225. Module 239 uses data representing a plan consisting of GPS waypoints with respective delivery instructions from the Planning Module 227. In an example, delivery instructions can include instructions for use by a Payload Release Module 243 that defines when some or all of a payload carried by a delivery UAV 225 should be released. That is, the delivery instructions can specify what (and how much) is delivered at a waypoint along a planned route of a delivery UAV 225, which can vary from 0-100% of a payload of the delivery UAV 225.

Execution module 239 provides a Flight Control Module 241 with information relating to waypoints. This enables the flight control module 214 to set/adjust a trajectory using motors 245 of the delivery UAV 225 to travel to a waypoint, at which point it can send instructions to a Payload Release Module 243 to release some or all of a payload.

Execution module 239 can generate and transmit status updates based on data received from Payload Release module 243, Flight Control module 241, and a Power Management module 251 over the communication link to the Monitoring Module 229 of the base unit 201. In an example, Flight Control Module 241 is configured to autonomously control UAV flight. This can include GPS waypoint navigation as noted above, as well as obstacle collision avoidance.

According to an example, delivery UAVs 225 can be re-routed mid-flight in response to a dynamic post-disaster environment, for instance if a delivery fails or a target site data is updated. Monitoring functionality and autonomous flight control enable the system to be operated by a minimal number of operators. To co-ordinate the different nodes over the communication network, middleware such as ROS (Robotics Operating System) can be implemented. ROS uses a publish-subscribe framework allowing agents to interact with topics, thus enabling a modular design and integration of commercial off-the-shelf (COTS) hardware.

According to an example, a scenario in which a set of delivery UAVs form a communication structure for a set of delivery UAVs in relation to a base unit can be described as a complete graph G with nodes representing base locations B and n target sites T, and with travel time (modelled by Euclidean distance) between nodes $t_i$ and $t_j$ as edge costs $c_{ij}$. A fleet of delivery UAVs, D, traverses the graph. Each target site t∈T has a payload demand $q_{t,s} \geq 0$ at time s that may be fulfilled by one or more visiting delivery UAV d∈D. Heterogeneous UAVs and multiple bases can be supported. Note that each target has a payload demand in terms of weight, and each delivery UAV can carry a fixed payload. When a delivery UAV returns to base, a payload and battery recharge can be considered to occur.

With traditional vehicle routing problems (VRP), each vehicle must start and finish at a base, and return-to-base costs are included, whereas, according to an example, although each vehicle (UAV) starts at a base unit, the scenario ends when all target nodes have been fulfilled, and final return-to-base costs are omitted (since these costs are not relevant in, e.g., humanitarian scenarios, when optimising for the maximum time taken to arrive at a target site i.e., MT). Each delivery UAV, d, has a maximum payload capacity $p_{max}$, d and flight time $f_{max}$, d. To traverse a graph edge, a remaining payload $p_d \geq 0$ and flight time $f_d \geq 0$ are decremented, thus a UAV is distance-constrained and returns to base before the latter depletes entirely. Each UAV d is assigned a sequence $S_d$:

$$S_d = \left( \left( t_{d,0}, p_{max_d}, f_{max_d}, 0 \right), (t_{d1}, p_{d1}, f_{d1}, s_{d1}), \ldots, (t_{dm}, p_{dm}, f_{dm}, s_{dm}) \right)$$

of remaining payloads and flight times, with visit times $s_{dx}$, and $t_{dx}$ representing either a base or target, possibly included more than once in the sequence. For comparison, an optimisation can comprise one of:

total time $TT = \Sigma_{d \in D} s_{dm}$, as per the traditional maximum site arrival time VRP (MTVRP) paradigm, or     maximum time $MT = \max\{s_{dm} | d \in D\}$ for any site to be fulfilled.

In an example, optimisations are subject to the constraints $\forall d \in D$:

$t_{d0}$ is a base unit, $t_{dm}$ is a target.

If $t_{dx}$ and $t_{d(x+1)}$ are both targets in $S_d$, then $p_{dx} - p_{d(x+1)} = \max\{p_{dx}, q_{t_{dx}, s_{dx}}\}$, i.e. a delivery UAV will deliver the maximum payload it can up to the demand at each target.

If $t_{dx}$ is a base unit in $S_d$, then $p_{dx} = p_{max,d}$ and $f_{dx} = f_{max,d}$, i.e. a delivery UAV is reloaded and recharged when it returns to a base unit.

If $c_{t_{dx}, t} + \text{dist}(t, \text{nearest base}) > f_{dx} \; \forall$ targets $t \in T$, $t \neq t_{dx}$ or $p_{dx} = 0$ then $t_{d(x+1)}$ is a base unit.

According to an example, a graph node can represent a many-to-many mapping between UAVs and targets. In order to create a delivery route for a delivery UAV a method derived from the A* algorithm, which itself is a modification of Dijkstra's algorithm to solve the Travelling Salesman Problem (TSP) can be used. The modification can be implemented using an adaptation of Kruskal's Minimum-Spanning-Tree (MST) algorithm for a heuristic to reduce problem-space growth.

For single-vehicle TSP solutions, an MST of the remaining nodes can be used as a suitable heuristic. However, according to an example, a modified approach to the MTVRP can be used. In particular, an underestimate for the heuristic may be used since a UAV may be used in the cost of more than one Partial Spanning Tree (PST). Further, if a PST is nearer to a base than a UAV, this distance can be used instead. There may be several nodes in a list representing equivalent UAV-target mappings. For instance, if two UAVs $d_1$ and $d_2$ have the same specifications, then for targets $t_1$ and $t_2$ the mappings $\{(d_1; t_1); (d_2; t_2)\}$ and $\{(d_1; t_2); (d_2; t_1)\}$ are equivalent. To reduce the search space, a node is only added to the list if it contains no equivalent nodes. Since many non-equivalent nodes may have the same heuristic total cost, the list thus defines a queue that prioritises mappings by:

firstly, higher numbers of targets fully satisfied,
    secondly, higher numbers of drones included,
    thirdly, more equitable work distribution across drones.

As a graph is expanded, one more UAV-target pair is added to the mapping at each new node, stopping when all targets are mapped.

According to an example, an upper bound for the number of communication UAVs to support the delivery plan created as described above can also be based on the A* algorithm. Each node in the acyclic graph represents a partial set of communication UAV locations to support communication to the delivery UAVs at a given time. As the graph expands, a communication UAV is added within the supported region boundary at each new node. The locations considered for communication UAV positions are where the multi-hop perimeters around each delivery UAV range beyond the supported region intersect with the multi-hop perimeters around the base unit and communication UAV.

According to an example, in order to determine a set of delivery routes for delivery UAVs, the following procedure can be implemented, in which there are inputs D (the set of delivery UAVs), B (the set of bases, representing the position of base units), and T (the set of target sites, representing waypoints at which a delivery UAV can, e.g., perform a drop). A heuristic function of a node, h(n) (described in more detail below), along with a cost function between two nodes, $c(n_1; n_2)$ is also provided as input.

The output (n) provides a solution node with all $t \in T$ fully assigned. Note that, in an example, a node represents a partial D→T many-to-many mapping, and $t \in T$ is fully assigned if enough drones $d \in D$ are mapped to it to satisfy its payload demand.

If $n_0$ is the start node with no UAV-Target assignments, and zero total cost $c_{n0} = 0$, then:

```
1: Open := {n₀}
2: Closed := ∅
3: while Open ≠ ∅
4:    Let n ∈ Open s.t. cₙ + h(n) ≤ cₘ + h(m), ∀m ∈ Open
5:    if n has all Targets fully assigned then
6:        return n
7:    if n ∉ Closed then
8:        Closed := Closed ∪ {n}
9:        S := set of all successor nodes of n (note that a successor node has the
          D → T mapping of n with an additional UAV-Target assignment.
12:       foreach nₛ ∈ S do
13:           Calculate total cost from n₀ to nₛ
14:           c_new = cₙ + c(n, nₛ)
15:           if c_{nₛ} is nil or c_new < c_{nₛ} then
16:               c_{nₛ} := c_new (i.e., set the new cost for nₛ)
17:           (Remove nₛ from Closed, add to Open)
18:               Closed := Closed \ {nₛ}
19:               Open := Open ∪ {nₛ}
```

The heuristic can take as input a node derived from the process described above. Again, D is the set of UAVs, and B is the set of base units, also $T_U$ represents the set of non-fully assigned targets. The output provides the estimated remaining cost to reach a full UAV-Target assignment node from n. As such:

```
 1: E: = {{t₁, t₂} | t₁, t₂ ∈ T_U} (edges in graph G with nodes T_U using Euclidean distance)
 2: 𝕊 = ∅ (the set of disjoint partial spanning trees of G)
 3: i = |T_U| − |D| (the number of edges to add to an S ∈ 𝕊).
 4: Accordingly, while i >0,
 5:    let e ∈ E such that || e ||≤|| f ||, ∀f ∈ E, then
 6:        E: = E \ {e} (remove shortest edge e from E), and
 7:        foreach S E 𝕊 do
 8:            if e creates a graph-cycle in S then
 9:                go to 4.
10:        if e joins two graphs S₁, S₂ ∈ E 𝕊 then
11:            𝕊: = [𝕊 \ {S₁, S₂}] ∪ {S₁ ∪ S₂} (i.e., merge S1; S2)
12:        else, if e joins one graph S ∈ 𝕊 then
13:            S: = S ∪ e (i.e., add e to the graph S ⊆ T_U)
14:        else (where e joins no graphs in 𝕊)
15:            𝕊: = 𝕊 ∪ {e} (create two-node graph)
16:        foreach t ∈ T_U \ U_{S⊆}𝕊 S (target t not in any partial spanning tree), then do
18:            𝕊: = 𝕊 ∪ {{t}} (create one-node graph)
19:        i: = i − 1
        assert (|𝕊| ≤ |D|)
20: C = ∅
21: foreach S ∈ 𝕊 do
22:     C: = C ∪ {PST_COST(S, D, B)} (PST cost is described in more detail below)
23. if optimising MT then
23:     h := 0 (i.e., find maximum total time for a UAV to travel to
24:     the destination specified in n's UAV-destination mapping)
25:     d_max = max(travel time for UAV ∈ D for n)
26:     while C # ∅ (pair UAVs with PST costs)
27:         C_max = max(C) (largest cost to full assignment)
28:         d_min = min(travel time for UAV ∈ D for n)
29:         Δc = c_max − (d_max − d_min)_
30:         if h <Δc then
31:             h := Δc
32:             C: = C{c_max} (remove cost)
33:             D: = D{d_min} (remove UAV)
34:     return h
35: elseif optimising TT then
36:     return Σ_{c∈C} c (i.e., sum of all PST costs)
```

According to an example, a PST cost (line 22 above) can be determined using a PST input from the process described above, along with D and B. The output, c, is the estimated remaining cost from a node n to satisfy the payload demands for the Targets in S. Thus:

```
 1: c_edges: = Σ_{e∈S}|e|, c_drones: = 0
 2: p_r: = Σ_{t∈S} (payload demand for Target t)
 3: p := 0 (payload taken from delivery UAVs)
 4: b := round trip cost to nearest base to S, i := 1
 5: while p_r ≥ p and i ≤ |D|
 6:     d: = i^{th} nearest drone to S
 7:     (the cost from S to d is the Euclidean distance from d to the nearest Target in
 S possibly including a detour to base to reload or recharge)
 8:     if i ≠ 1 and b ≤ cost(S, d) then
 9:         It is cheaper for UAV at S to return to base first
10:         p := p + payload capacity of d
11:         c_drones: = c_drones + b
12:     else
13:         cdrones := c_drones + cost(S, d)
14:         if d must return to base to reload or recharge then
15:             p := p + payload capacity of d
16:         else
17:             p := p + remaining payload of d
        i := i + 1
18: while p < pr
19:     (all drone payloads used so use return trips to base)
20:     p: = p + max{ payload capacity of d | d ∈ D}
21     c_drones: = c_drones + b
22: return c_edges + c_drones
```

This route generating process is repeated each time t∈T a delivery UAV reaches a target (since these include the maximum distances travelled), thus finding an upper bound for the communication UAV requirement at that instant. The minimum number of communication UAVs required to fulfil the support requirement can then be determined. In an example, each successor node corresponds to a t∈T, and maps the existing communication UAVs to new relay positions. According to an example, extra communication UAVs can be added if the existing UAVs cannot reach the positions. This results in routes for a fleet of communication UAVs which are sufficient to support communications to the given delivery routes.

In order to determine communication UAV positioning, the set of delivery UAV routes determined as described above forms an input for a process that also uses B (the set of base units), and r (the maximum (no-hop) communication range). The output is $n_r$, which is the upper bound of communication UAV count for a mission. Accordingly, the process to determine this upper bound can proceed as follows:

```
1: T := set of timestamps when a UAV reaches a target
2: n_r := 0
3: m := 0 (maximum number of hops required)
4: foreach t ∈ T do
5:      U := drone positions on delivery routes at time t
6:      C: = ∅
7:      foreach u ∈ U do
8:              if ∃b ∈ B such that || u − b ||< r then
9:                      m_p: = min(ceiling(|| u − b ||/r) | b ∈ B)
10:                     m: = max(m, n_p)
11:                     foreach i ≤ m_p do
12:                             C: = C ∪ { circle centre p, radius ir}
13:             else
14:                     U: = U \ {u} (i.e., remove u)
15:     C: = C ∪ {circle centre b, radius ir | i ≤ m, b ∈ B}
16: Each node n represents a set of communication circles C_n and P_n ⊆
{intersection centroid for c_1, ... , c_m ∈ C_n}
17: h(n) = The heuristic function for node n, which finds a maximum across each
        cluster of u ∈ U of the minimum number of hops required to reach a p ∈
P_n or b ∈ B
18:     Open := {n_0} (i.e., the start node with no communication UAVs, zero total cost
        c_{n0} = 0, and circles C_{n0} = C)
19:     Closed := ∅
20:     while Open ≠ ∅
21:             Let n ∈ Open such that
                c_n + h(n) ≤ c_m + h(m), ∀m ∈ Open
22:             if ∀u ∈ U, ∃p ∈ P_n such that || u − p ||< r then
23:                     n_r: = max(n_r, |P_n|)
24:                     go to Line 4.
25:             if n ∉ Closed then
26:                     Closed : = Closed ∪ {n}
27:                     S := set of all successor nodes of n
28:                     (a successor node represents P_n ∪ {p} ⊆ P where ∃p_n ∈
P_n such that ||p − P_n|| ≤ r)
29:                     foreach n_s ∈ S do
30:                             (calculate total cost from n_0 to n_s)
31:                             c_{new} = c_n + c(n, n_s)
32:                             if C_{n_s} is nil or c_{new} < C_{n_s} then
33:                                     c_{n_s}:= c_{new}
34:                                     C_{n_s} = C_n ∪ { circle centre p, radius r}
35:                                     Closed : = Closed \ {n_s}
36:                                     Open: = Open ∪ {n_s}
37: return n_r
```

According to an example, a heuristic can be used to group the unsupported delivery UAVs into clusters with a maximum intra-cluster distance of twice the communication range. In an example, this can be performed using agglomerative hierarchical clustering, in which each point in turn is either added as a single-point cluster to the set of clusters or adjoined to the nearest cluster so long as the maximum intra-cluster distance is maintained. It then finds the cluster which is furthest from the supported region and calculates how many additional communication UAVs are required to support it. This can an underestimate since not all unsupported drones are necessarily considered. When all delivery UAVs are within range of a communication UAV or a base unit, the route generation can conclude.

As with the previous method, many non-equivalent nodes may have the same heuristic total cost, so the Open list is a queue that prioritises nodes with:
first, communication UAVs at intersections of more circles, since they possibly support more delivery UAVs,
second, a higher spread of communication UAVs,
third, a shorter distance from the centroid of the unsupported delivery UAVs to a communication UAV.

Figure 3:
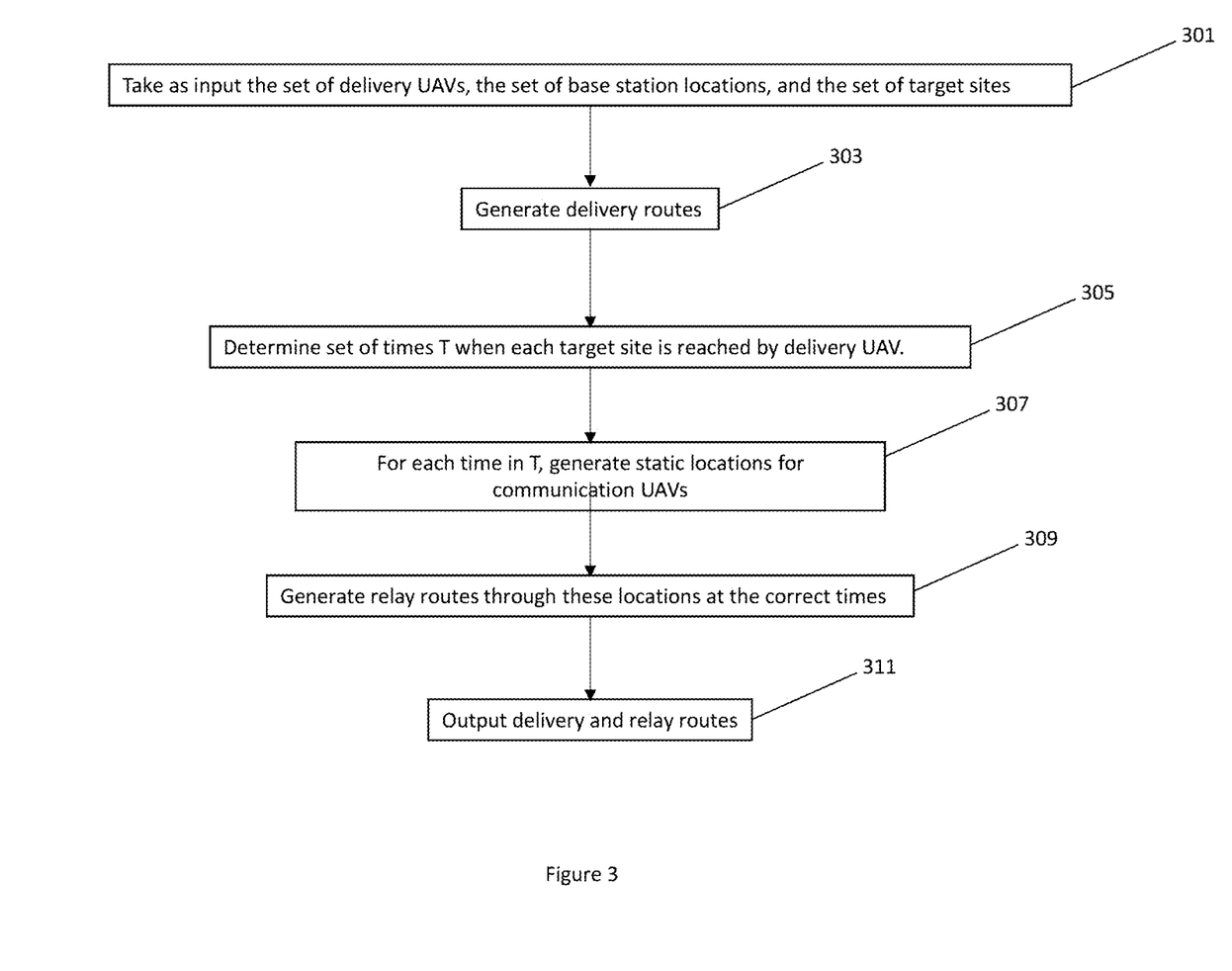
FIG. 3 is a flowchart of a method according to an example.

FIG. 3 is a flowchart of a method for determining a communication structure to communicatively link a set of delivery UAVs unmanned aerial vehicles according to an example. In block 301 a set of delivery UAVs, the set of base unit (station) locations, and the set of target locations is provided and may be used as input to, e.g., the process described above in order to generate a set of delivery routes for the delivery UAVs, in block 303. At block 305, a set of times T is determined representing the time when each target location is reached by delivery UAV. In block 307, for each time in T, the static locations for the communication UAVs are generated. In block 309, relay routes are generated through these locations at the correct times, and the delivery and relay routes are output at block 311.

Figure 4:
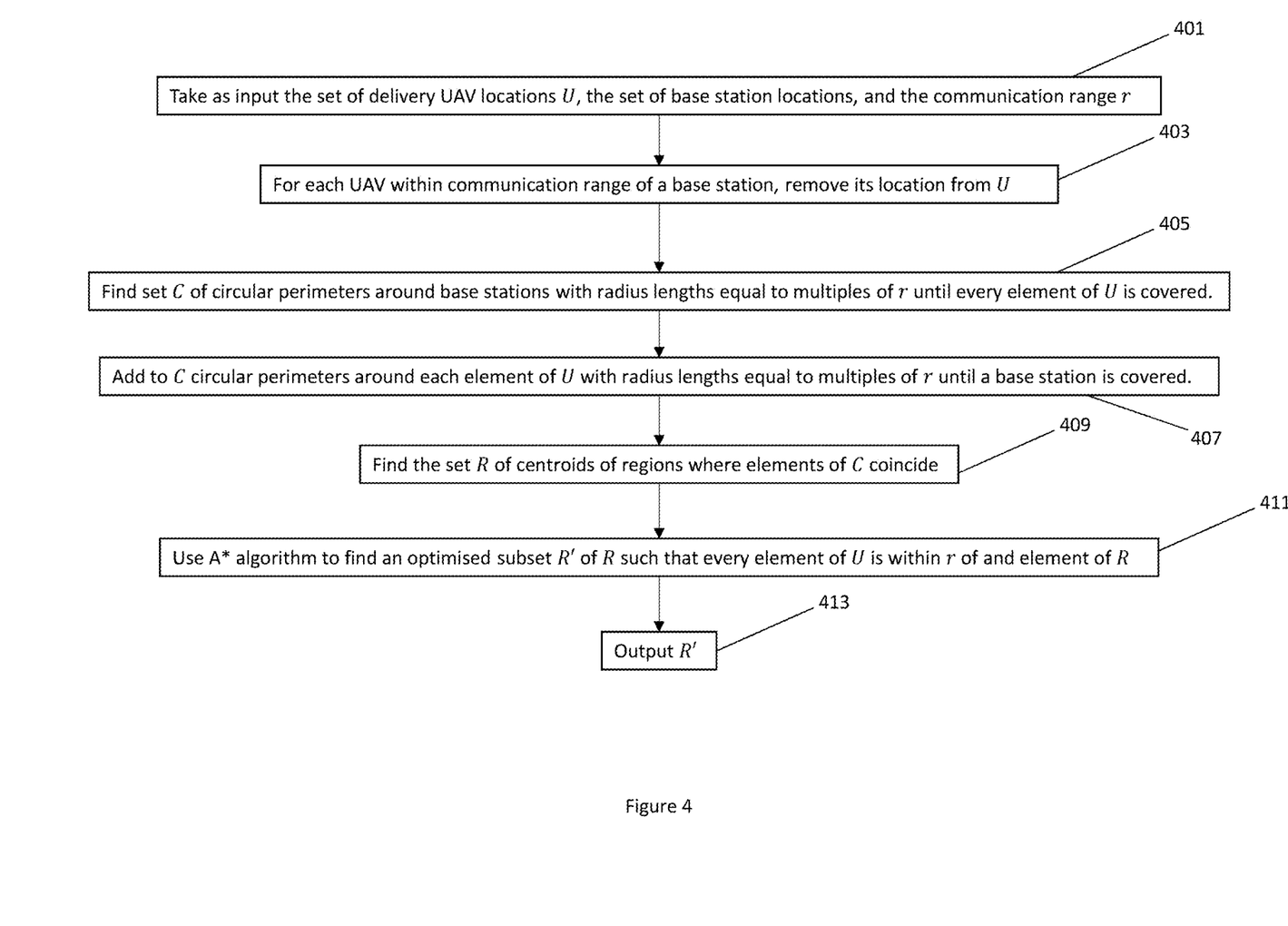
FIG. 4 is a flowchart of a method according to an example.

FIG. 4 is a flowchart of a method for determining a communication structure to communicatively link a set of delivery unmanned aerial vehicles according to an example. In block 401 a set of delivery UAV locations U, the set of base unit locations, and the communication range r is provided as input to the process described above in order to generate a set of centroids. In block 403, each UAV within communication range of a base unit, has its location removed from U. In block 405, a set C of circular perimeters around base stations with radius lengths equal to multiples of r is found until every element of U is covered. In block 407, C circular perimeters around each element of U are supplemented with radius lengths equal to multiples of r until a base unit is covered. In block 409, a set R of centroids of regions where elements of C coincide is determined. In block 411, an optimised subset R' of R such that every element of U is within r of and element of R is determined. In an example, this can be determined using the process described above. In block 413, the optimised subset is provided as output.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode. For example, the instructions may be provided on a non-transitory computer readable storage medium encoded with instructions, executable by a processor.

Figure 5:
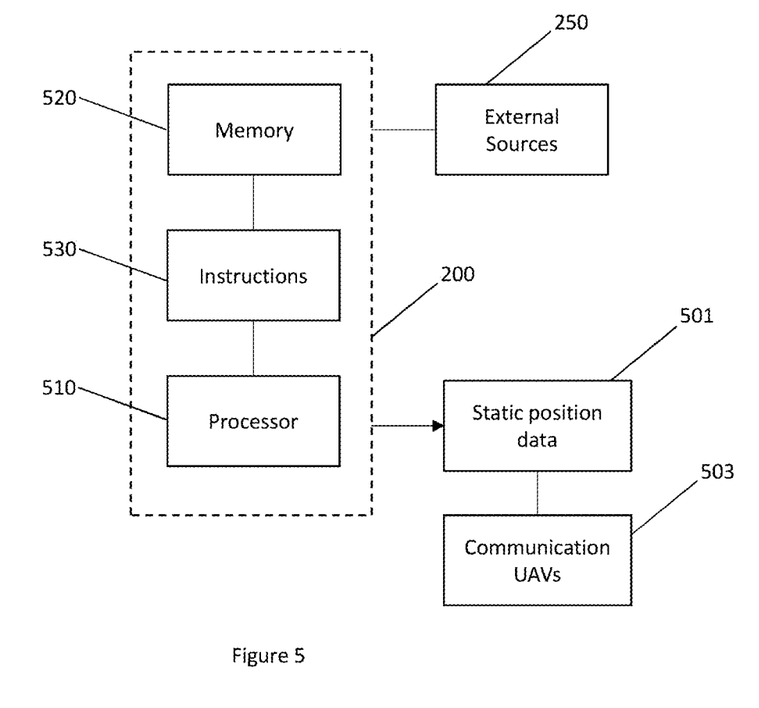
FIG. 5 is a schematic representation of part of a system method according to an example.

FIG. 5 is a schematic representation of a processor associated with a memory according to an example. In the example of FIG. 5, the memory 520 comprises computer readable instructions 530 which are executable by the processor 510. In an example, the processor 510 and memory 520 can be provided as part of a base unit 200 that can receive data from the external sources 250 described with reference to FIG. 2.

The instructions 530 can be used to cause the processor 510 to generate a set of static relay positions 501 defining a communication link for a set of delivery UAVs 503. The static relay positions can be so positioned relative to a delivery route of a delivery UAV as to enable communication between an airborne delivery UAV and a base unit. That is, as described above, the communication UAVs 503 can form a communication structure to provide a stable communication link between a delivery UAV and the base unit 200.

The instructions 530 can be used to cause the processor 510 to group a set of unsupported delivery UAVs into one or more clusters defined by a maximum intra-cluster distance related to a communication region. That is, a delivery UAV which is not within a communication region of a communication UAV is unsupported (inasmuch as it is not communicatively coupled to the base unit 200 using the communication structure). Such an unsupported delivery UAV can form the basis of a single-point cluster or augment an existing cluster using an agglomerative hierarchical clustering process. In an example, the instructions 530 can be used to cause the processor 510 to determine a cluster furthest from a supported communication region, and determine a number of additional communication UAVs to support the cluster furthest from a supported communication region.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the present disclosure. In particular, a feature or block from one example may be combined with or substituted by a feature/block of another example.

The features of any dependent claim may be combined with the features of any of the independent claims or other dependent claims.

The invention claimed is:

1. A method for determining a communication structure to communicatively link a set of delivery unmanned aerial vehicles, UAVs, with a base unit, the communication structure defined by a minimum number of communication UAVs positioned relative to a set of delivery routes of the delivery UAVs at multiple transitory static positions, wherein a communication UAV at a transitory static position supports a communication region, the method comprising:

determining a subset of delivery UAVs outside of a communication region of each communication UAV in a set of communication UAVs at respective first transitory static positions as the delivery UAVs travel along their respective delivery routes, the subset of delivery UAVs representing a number of unsupported delivery UAVs that are not communicatively linked, via a communication UAV, to the base unit;

grouping the unsupported delivery UAVs into one or more clusters defined by a maximum intra-cluster distance related to a communication region; and selecting a second transitory static position for at least one of a communication UAV in the set of communication UAVs, respectively, the second transitory static position minimising the number of unsupported delivery UAVs.

2. The method as claimed in claim 1, further comprising: determining the subset of delivery UAVs at each point in time corresponding to presence of a delivery UAV at a target location disposed along the delivery route.

3. The method as claimed in claim 1, further comprising regulating the minimum number of communication UAVs on the basis of a maximum number of communication hops from a delivery UAV to the base unit.

4. The method as claimed in claim 1, further comprising: generating the set of delivery routes of the delivery UAVs on the basis of a number of delivery UAVs, a location of a base unit, and a number and location of each target location.

5. The method as claimed in claim 1, further comprising: generating a set of first transitory static positions for communication UAVs in the set of communication UAVs on the basis of the set of delivery routes.

6. The method as claimed in claim 5, further comprising: generating a route for a communication UAV using the set of first transitory static positions as waypoints.

7. The method as claimed in claim 1, wherein the intra-cluster distance is twice a communication range of a communication UAV.

8. The method as claimed in claim 1, further comprising: grouping the unsupported delivery UAVs using agglomerative hierarchical clustering to form a single-point cluster or augment an existing cluster.

9. The method as claimed in claim 1, further comprising: determining a cluster furthest from a supported communication region; and
determining a number of the second transitory static positions to support the cluster furthest from a supported communication region.

10. A system, comprising:
a set of delivery unmanned aerial vehicles, UAVs, each delivery UAV configured to follow a delivery route;
a set of communication UAVs, each supporting a communication region, where the set of communication UAVs form a communication structure to communicatively link the set of delivery UAVs with a base unit; and
a processor configured to:
determine a set of initial transitory static positions relative to the delivery routes of the delivery UAVs, for the set of communication UAVs, respectively, to maximize a number of delivery UAVs whom are able to communicate with the base unit via the communication structure throughout the delivery UAVs travel along their delivery routes, respectively, using a minimum number of communication UAVs; and
determine a second transitory static position for at least one of the communication UAVs in the set of communication UAVs as each delivery UAV travels along its respective delivery route, the determination is based on a number of delivery UAVs that are unsupported by the communication structure and not able to use the communication structure to communicate with the base unit, where a delivery UAV is unsupported when outside a communication region of each communication UAV in the set of communication UAVs and the delivery UAVs that are unsupported are grouped into one or more clusters defined by a maximum intra-cluster distance related to a communication region.

11. The system as claimed in claim 10, wherein a communication UAV supports multiple communication protocols.

12. The system as claimed in claim 11, wherein a first communication protocol is used to provide intra-communication-region communication, and wherein a second communication protocol is used to provide inter-communication-region communication.

13. The method as claimed in claim 2, further comprising regulating the minimum number of communication UAVs on the basis of a maximum number of communication hops from a delivery UAV to the base unit.

14. The method as claimed in claim 2, further comprising: generating the set of delivery routes of the delivery UAVs on the basis of a number of delivery UAVs, a location of a base unit, and a number and location of each target location.

15. The method as claimed in claim 3, further comprising: generating the set of delivery routes of the delivery UAVs on the basis of a number of delivery UAVs, a location of a base unit, and a number and location of each target location.

16. The method as claimed in claim 2, further comprising: generating a set of first transitory static positions for communication UAVs in the set of communication UAVs on the basis of the set of delivery routes.

17. The system as claimed in claim 10, wherein the communication UAV is smaller and/or lighter than the delivery UAV.

18. The system as claimed in claim 10, wherein the communication UAV does not have payload delivery hardware.

19. The system as claimed in claim 10, wherein the processor is configured to determine a number of delivery UAVs in the set of delivery UAVs based on a number of target locations for delivery and determine each delivery route.

* * * * *